US007406303B2

(12) United States Patent
Deng et al.

(10) Patent No.: US 7,406,303 B2
(45) Date of Patent: Jul. 29, 2008

(54) MULTI-SENSORY SPEECH ENHANCEMENT USING SYNTHESIZED SENSOR SIGNAL

(75) Inventors: Li Deng, Sammamish, WA (US); Zhengyou Zhang, Bellevue, WA (US); Zicheng Liu, Bellevue, WA (US); Amarnag Subramanya, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/228,710

(22) Filed: Sep. 16, 2005

(65) Prior Publication Data

US 2007/0010291 A1 Jan. 11, 2007

Related U.S. Application Data

(60) Provisional application No. 60/696,678, filed on Jul. 5, 2005.

(51) Int. Cl.
*H04B 1/06* (2006.01)
*H04B 7/00* (2006.01)

(52) U.S. Cl. ................ 455/260; 455/114.2; 455/414.1; 455/67.11; 455/296

(58) Field of Classification Search ............. 455/414.1, 455/501, 67.11–67.15, 76, 550.1, 570, 260, 455/114.2, 226.1, 296; 381/312, 151–153
See application file for complete search history.

(56) References Cited

U.S. PATENT DOCUMENTS 3,383,466 A 5/1968 Hilix et al. .................... 179/1
3,746,789 A 7/1973 Alcivar ......................... 179/1
3,787,641 A 1/1974 Santori ...................... 179/107
5,054,079 A 10/1991 Frielingsdorf et al. ....... 381/151
5,151,944 A 9/1992 Yamamura ................. 381/151
5,197,091 A 3/1993 Takagi et al. .......... 379/433.12
5,295,193 A 3/1994 Ono .......................... 381/151
5,404,577 A 4/1995 Zuckerman et al. .......... 455/66
5,446,789 A 8/1995 Loy et al.
5,555,449 A 9/1996 Kim ..................... 379/433.03
5,647,834 A 7/1997 Ron ........................... 600/23
5,692,059 A 11/1997 Kruger ...................... 381/151
5,757,934 A 5/1998 Yokoi ....................... 381/68.3
5,828,768 A 10/1998 Eatwell et al. ............. 381/333
5,873,728 A 2/1999 Jeong ........................ 434/185

(Continued)

FOREIGN PATENT DOCUMENTS

DE 199 17 169 11/2000

(Continued)

OTHER PUBLICATIONS

U.S. Appl. No. 10/629,278, filed Jul. 29, 2003, Huang et al.

(Continued)

*Primary Examiner*—Tony T Nguyen
(74) *Attorney, Agent, or Firm*—Theodore M. Magee; Westman, Champlin, & Kelly, P.A.

(57) ABSTRACT

A synthesized alternative sensor signal is produced from an alternative sensor signal. The synthesized alternative sensor signal is computed using vocal tract resonances estimated based on the alternative sensor signal, and using a waveform synthesis technique that converts the estimated vocal tract resonance sequence into a spectral magnitude sequence. The synthesized alternative sensor signal and the alternative sensor signal are used to estimate a clean speech value.

20 Claims, 7 Drawing Sheets

U.S. PATENT DOCUMENTS

| | | | | |
|---|---|---|---|---|
| 5,933,506 | A | 8/1999 | Aoki et al. | 381/151 |
| 5,943,627 | A | 8/1999 | Kim et al. | 379/426 |
| 5,983,073 | A | 11/1999 | Ditzik | 455/11.1 |
| 6,028,556 | A | 2/2000 | Shiraki | 343/702 |
| 6,052,464 | A | 4/2000 | Harris et al. | 379/433 |
| 6,052,567 | A | 4/2000 | Ito et al. | 455/90 |
| 6,091,972 | A | 7/2000 | Ogasawara | 455/575.7 |
| 6,094,492 | A | 7/2000 | Boesen | 381/312 |
| 6,125,284 | A | 9/2000 | Moore et al. | 455/557 |
| 6,137,883 | A | 10/2000 | Kaschke et al. | 379/433.07 |
| 6,175,633 | B1 | 1/2001 | Morrill et al. | 381/71.6 |
| 6,243,596 | B1 | 6/2001 | Kikinis | 429/8 |
| 6,308,062 | B1 | 10/2001 | Chien et al. | 455/420 |
| 6,339,706 | B1 | 1/2002 | Tillgren et al. | 455/419 |
| 6,343,269 | B1 | 1/2002 | Harada et al. | 704/243 |
| 6,408,081 | B1 | 6/2002 | Boesen | 381/312 |
| 6,411,933 | B1 | 6/2002 | Maes et al. | 704/273 |
| 6,542,721 | B2 | 4/2003 | Boesen | 455/90 |
| 6,560,468 | B1 | 5/2003 | Boesen | 455/568 |
| 6,594,629 | B1 | 7/2003 | Basu et al. | 704/251 |
| 6,664,713 | B2 | 12/2003 | Boesen | 310/328 |
| 6,675,027 | B1 | 1/2004 | Huang | 455/575 |
| 6,760,600 | B2 | 7/2004 | Nickum | 455/557 |
| 7,054,423 | B2 | 5/2006 | Nebiker et al. | 379/201.01 |
| 2001/0027121 | A1 | 10/2001 | Boesen | 455/556 |
| 2001/0039195 | A1 | 11/2001 | Nickum | 455/557 |
| 2002/0057810 | A1 | 5/2002 | Boesen | |
| 2002/0075306 | A1 | 6/2002 | Thompson et al. | |
| 2002/0181669 | A1 | 12/2002 | Takatori et al. | |
| 2002/0196955 | A1 | 12/2002 | Boesen | |
| 2002/0198021 | A1 | 12/2002 | Boesen | 455/556 |
| 2003/0040908 | A1 | 2/2003 | Feng et al. | |
| 2003/0083112 | A1 | 5/2003 | Fukuda | 455/568 |
| 2003/0125081 | A1 | 7/2003 | Boesen | 455/556 |
| 2003/0144844 | A1 | 7/2003 | Colmenarez et al. | 704/273 |
| 2004/0092297 | A1 | 5/2004 | Huang | |
| 2005/0114124 | A1 | 5/2005 | Liu et al. | |
| 2005/0185813 | A1 | 8/2005 | Sinclair et al. | |
| 2006/0008256 | A1 | 1/2006 | Khedouri et al. | 386/124 |
| 2006/0009156 | A1 | 1/2006 | Hayes et al. | 455/63.1 |
| 2006/0072767 | A1 | 4/2006 | Zhang et al. | 381/71.6 |
| 2006/0079291 | A1 | 4/2006 | Granovetter et al. | 455/563 |
| 2006/0178880 | A1 | 8/2006 | Zhang et al. | |

FOREIGN PATENT DOCUMENTS

| | | | |
|---|---|---|---|
| EP | 0 720 338 | A2 | 7/1996 |
| EP | 0 854 535 | A2 | 7/1998 |
| EP | 0 939 534 | A1 | 9/1999 |
| EP | 0 951 883 | | 10/1999 |
| EP | 1 333 650 | | 8/2003 |
| EP | 1 569 422 | | 8/2005 |
| FR | 2 761 800 | | 4/1997 |
| GB | 2 375 276 | | 11/2002 |
| GB | 2 390 264 | | 12/2003 |
| JP | 3108997 | | 5/1991 |
| JP | 5276587 | | 10/1993 |
| JP | 8065781 | | 3/1996 |
| JP | 8070344 | | 3/1996 |
| JP | 8079868 | | 3/1996 |
| JP | 10-023122 | | 1/1998 |
| JP | 10-023123 | | 1/1998 |
| JP | 11265199 | | 9/1999 |
| JP | 2001119797 | | 10/1999 |
| JP | 2001245397 | | 2/2000 |
| JP | 2000-209688 | | 7/2000 |
| JP | 2000196723 | | 7/2000 |
| JP | 2000261529 | | 9/2000 |
| JP | 2000261530 | | 9/2000 |
| JP | 2000261534 | | 9/2000 |
| JP | 2000354284 | | 12/2000 |
| JP | 2001/292489 | | 10/2001 |
| JP | 2002-125298 | | 4/2002 |
| JP | 2002-358089 | | 12/2002 |
| WO | WO 93/01664 | | 1/1993 |
| WO | WO 95/17746 | | 6/1995 |
| WO | WO 00/21194 | | 10/1998 |
| WO | WO 99/04500 | | 1/1999 |
| WO | WO 00/45248 | | 8/2000 |
| WO | WO 02/098169 | A1 | 5/2002 |
| WO | WO 02/077972 | A1 | 10/2002 |
| WO | WO 03/055270 | A1 | 7/2003 |

OTHER PUBLICATIONS

U.S. Appl. No. 10/785,768, filed Feb. 24, 2004, Sinclair et al.

U.S. Appl. No. 10/636,176, filed Aug. 7, 2003, Huang et al.

Zheng Y. et al., "Air and Bone-Conductive Integrated Microphones for Robust Speech Detection and Enhancement" Automatic Speech Recognition and Understanding 2003. pp. 249-254.

De Cuetos P. et al. "Audio-visual intent-to-speak detection for human-computer interaction" vol. 6, Jun. 5, 2000. pp. 2373-2376.

M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.

P. Heracleous, Y. Nakajima, A. Lee, E. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.

O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.

Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.

Bakar, "The Insight of Wireless Communication," Research and Development, 2002, Student Conference on Jul. 16-17, 2002.

Search Report dated Dec. 17, 2004 from International Application No. 04016226.5.

European Search Report from Application No. 05107921.8, filed Aug. 30, 2005.

European Search Report from Application No. 05108871.4, filed Sep. 26, 2005.

"Physiological Monitoring System 'Lifeguard' System Specifications," Stanford University Medical Center, National Biocomputation Center, Nov. 8, 2002.

Nagl, L., "Wearable Sensor System for Wireless State-of-Health Determination in Cattle," Annual International Conference of the Institute of Electrical and Electronics Engineers' Engineering in Medicine and Biology Society, 2003.

Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.

U.S. Appl. No. 11/156,434, filed Jun. 20, 2005, Zicheng et al.

"Direct Filtering for Air-and Bone-Conductive Microphones," Zicheng Liu et al., Multimedia Signal Processing, 2004, IEEE 6th Workshop on Siena, Italy, pp. 363-366.

"Air-and Bone-Conductive Integrated Microphones for Robust Speech Detection and Enhancement," Yanli Zheng et al., Automatic Speech Recognition and Understanding, 2003, 249-254.

European Search Report from Appln No. 06100071.7, filed Jan. 4, 2006.

Z. Liu et al., "Leakage Model and Teeth Clack Removal for Air-and Bone-Conductive Integrated Microphones," in Proc. of the Int. Conf. on Acoustics, Speech and Signal Processing, Philadelphia, Mar. 2005.

J. Hershey et al., "Model-based Fusion of Bone and Air Sensors for speech Enhancement and Robust Speech Recognition," in Proc. ISCA Tutorial and research Workshops on Statistical and Perceptual Audio Processing, Jeju, South Korea, Oct. 2004.

L. Deng et al., "Nonlinear Information Fusion in Multi-sensor Processing—Extracting and Exploiting Hidden Dynamics of Speech Captured by a Bone-Conductive Microphone," in Proc. IEEE International Workshop on Multimedia Signal Processing, Siena, Italy, Sep. 2004.

I. Bazzi et al., "An Expectation-Maximization Approach for Formant Tracking Using A Parameter-Free Non-Linear Predictor," Proc. ICASSP, 2003, pp. 464-467.

L. Deng et al., "A Structured Speech Model with Continuous Hidden Dynamics and Prediction-Residual Training for Tracking Vocal Tract Resonances," Proc. ICASSP, Montreal, Canada, May 2004.

L. Deng et al., "Challenges in Adopting Speech Recognition," Communications of the ACM, vol. 47, No. 1, Jan. 2004, pp. 69-75.

MULTI-SENSORY SPEECH ENHANCEMENT USING SYNTHESIZED SENSOR SIGNAL

REFERENCE TO RELATED APPLICATIONS

This application claims priority benefit of U.S. Provisional Application 60/696,678 filed on Jul. 5, 2005.

BACKGROUND

A common problem in speech recognition and speech transmission is the corruption of the speech signal by additive noise. In particular, corruption due to the speech of another speaker has proven to be difficult to detect and/or correct.

Recently, systems have been developed that attempt to remove noise by using a combination of an alternative sensor, such as a bone conduction microphone, and an air conduction microphone. Various techniques have been developed that use the alternative sensor signal and the air conduction microphone signal to form an enhanced speech signal that has less noise than the air conduction microphone signal.

The discussion above is merely provided for general background information and is not intended to be used as an aid in determining the scope of the claimed subject matter.

SUMMARY

A synthesized alternative sensor signal is produced from an alternative sensor signal. The synthesized alternative sensor signal and the alternative sensor signal are used to estimate a clean speech value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION OF ILLUSTRATIVE EMBODIMENTS

Figure 1:
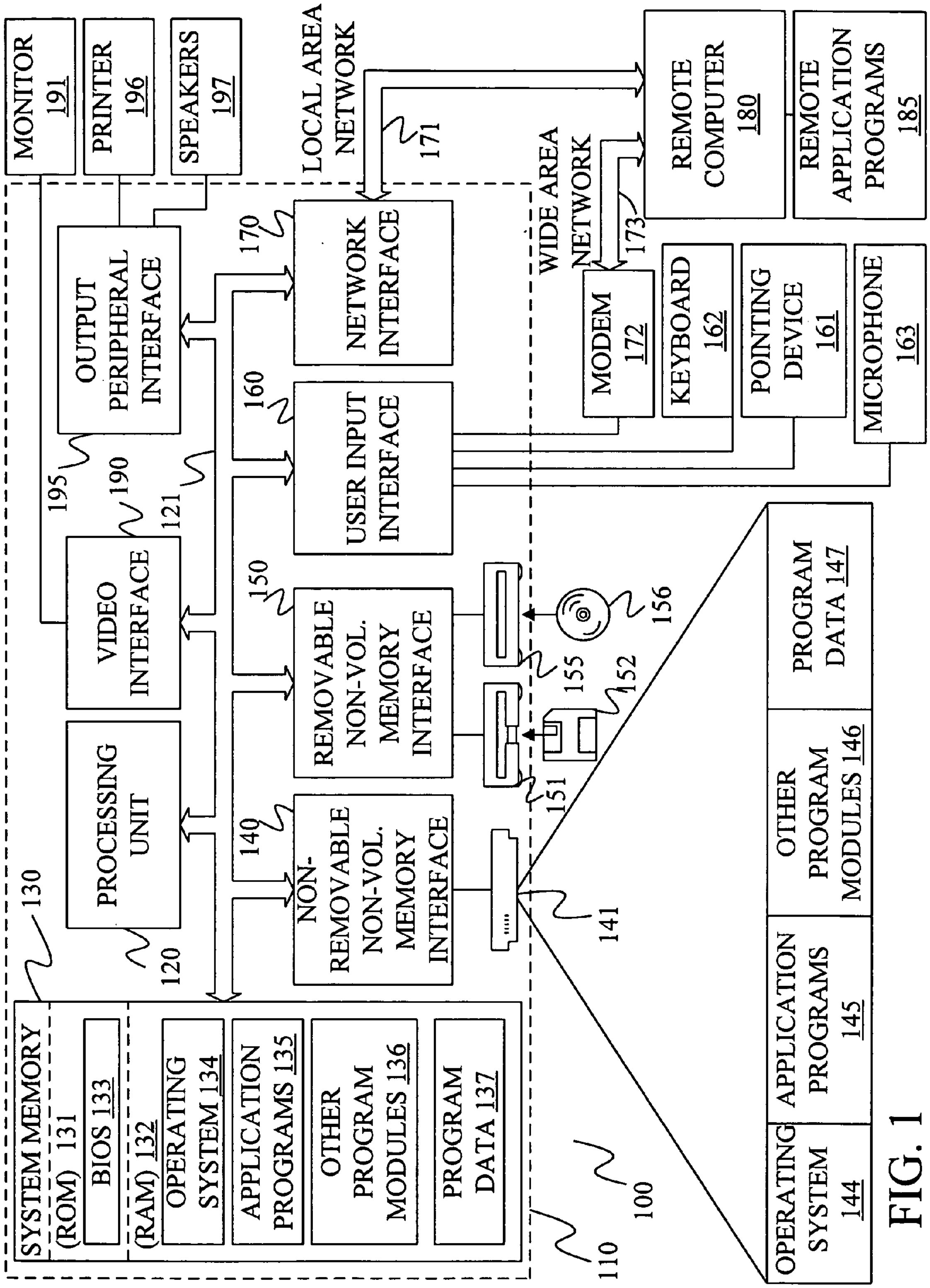
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
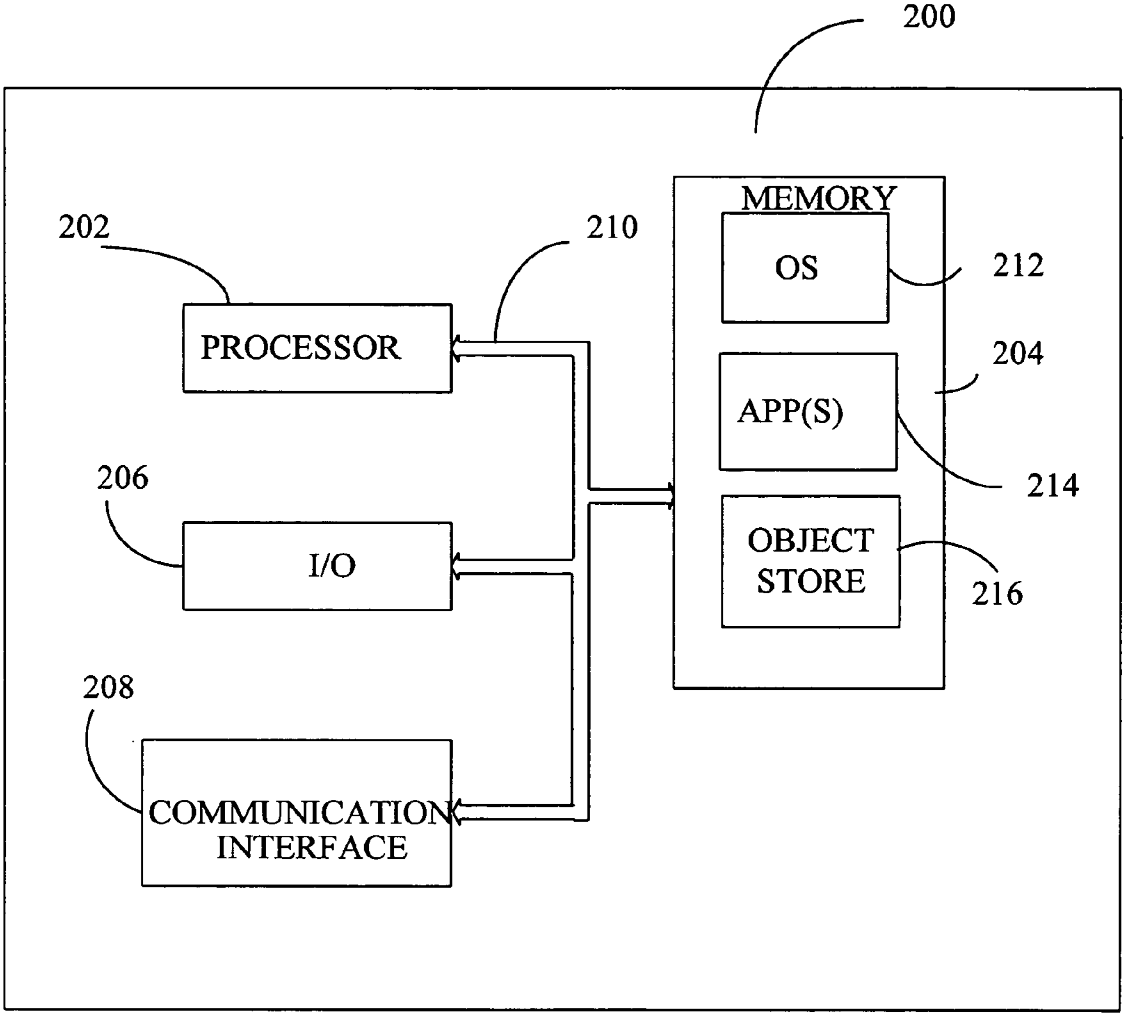
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
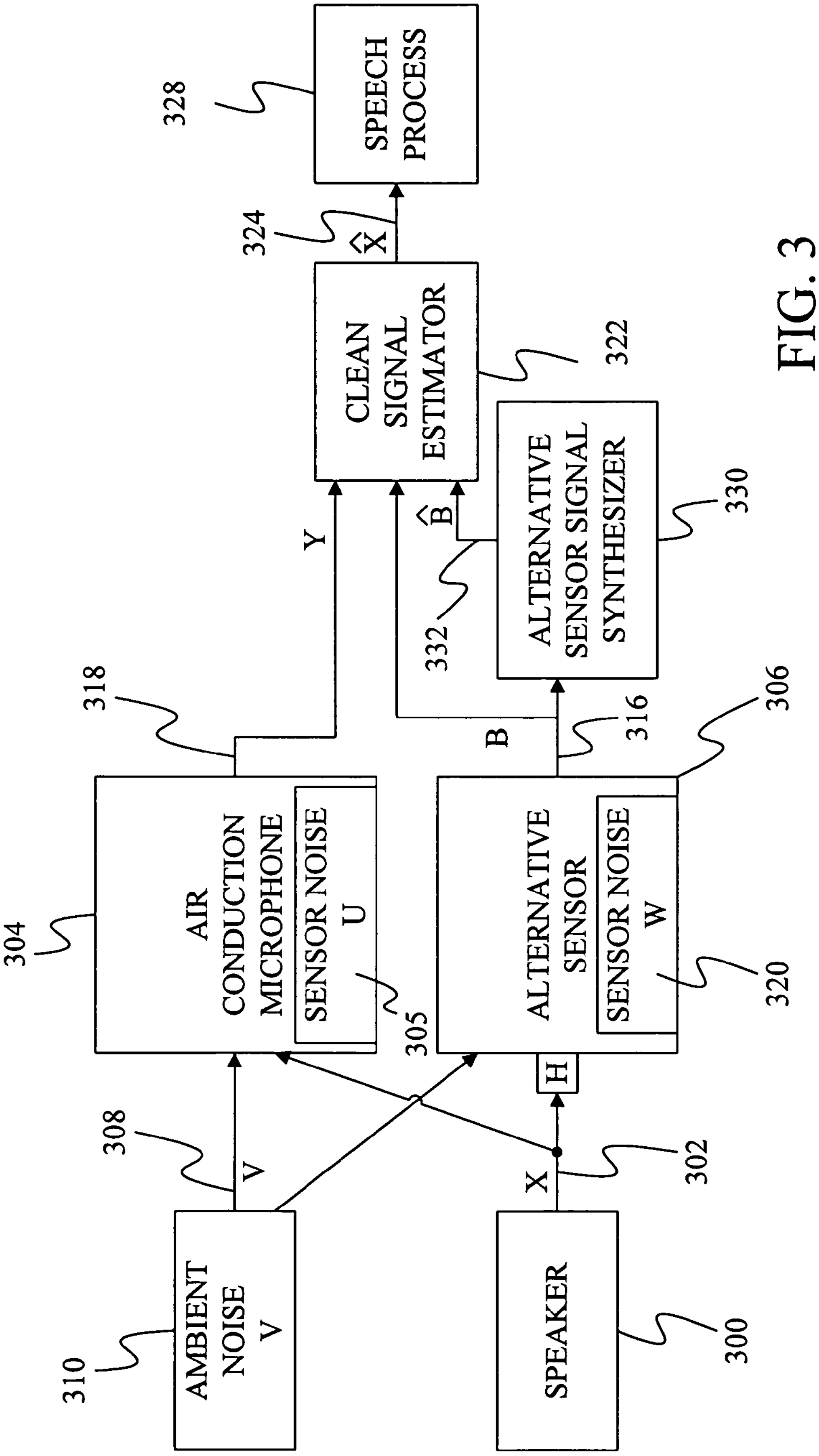
FIG. 3 is a block diagram of a general speech processing system.

FIG. 3 provides a basic block diagram of system that estimates clean speech from noisy speech signals. In FIG. 3, a speaker 300 generates a speech signal 302 (X) that is detected by an air conduction microphone 304 and an alternative sensor 306. Examples of alternative sensors include a throat microphone that measures the user's throat vibrations, a bone conduction sensor that is located on or adjacent to a facial or skull bone of the user (such as the jaw bone) or in the ear of the user and that senses vibrations of the skull and jaw that correspond to speech generated by the user. Air conduction microphone 304 is the type of microphone that is used commonly to convert audio air-waves into electrical signals.

Air conduction microphone 304 receives ambient noise 308 (V) generated by one or more noise sources 310 and generates its own sensor noise 305 (U). Depending on the type of ambient noise and the level of the ambient noise, ambient noise 308 may also be detected by alternative sensor 306. However, under embodiments of the present invention, alternative sensor 306 is typically less sensitive to ambient noise than air conduction microphone 304. Thus, the alternative sensor signal 316 (B) generated by alternative sensor 306 generally includes less noise than air conduction microphone signal 318 (Y) generated by air conduction microphone 304. Although alternative sensor 306 is less sensitive to ambient noise, it does generate some sensor noise 320 (W) and does detect teeth clack noise, that is formed when the teeth of the user's upper jaw contact the teeth of the lower jaw.

The path from speaker 300 to alternative sensor signal 316 can be modeled as a channel having a channel response H.

Alternative sensor signal 316 (B) is provided to an alternative sensor signal synthesizer 330, which generates a synthesized alternative sensor signal 332 ($\hat{B}$) by extracting Vocal Tract Resonances (VTRs) from alternative sensor signal 316 and converting the extracted VTR's into complex spectrum values.

Defined as the acoustic resonances for the oral portion of the vocal tract when the excitation is forced at the glottis, VTRs correspond to natural frequencies of the physical system. VTRs are related to but different from formants. Unlike formants, VTRs do not "disappear", merge, or split during any part of speech. Rather, they exist at real frequencies at all times, even when the mouth is closed. While VTRs exist at all times, they are not always observable and as such represent hidden dynamics of the speech signal.

VTRs from the alternative sensor are generally not affected by leakage noise or teeth clack in the alternative sensor signal. As a result, the synthesized alternative sensor signal formed from the VTRs has less noise and is thus useful in identifying an estimate of a clean speech signal.

Alternative sensor signal 316 (B), air conduction microphone signal 318 (Y), and the complex spectral domain values for the synthesized alternative signal 332 are provided to a clean signal estimator 322, which estimates a clean signal 324. Clean signal estimate 324 is provided to a speech process 328. Clean signal estimate 324 may either be a time-domain signal or a Fourier Transform vector. If clean signal estimate 324 is a time-domain signal, speech process 328 may take the form of a listener, a speech coding system, or a speech recognition system. If clean signal estimate 324 is a Fourier Transform vector, speech process 328 will typically be a speech recognition system, or contain an Inverse Fourier Transform to convert the Fourier Transform vector into waveforms.

Figure 4:
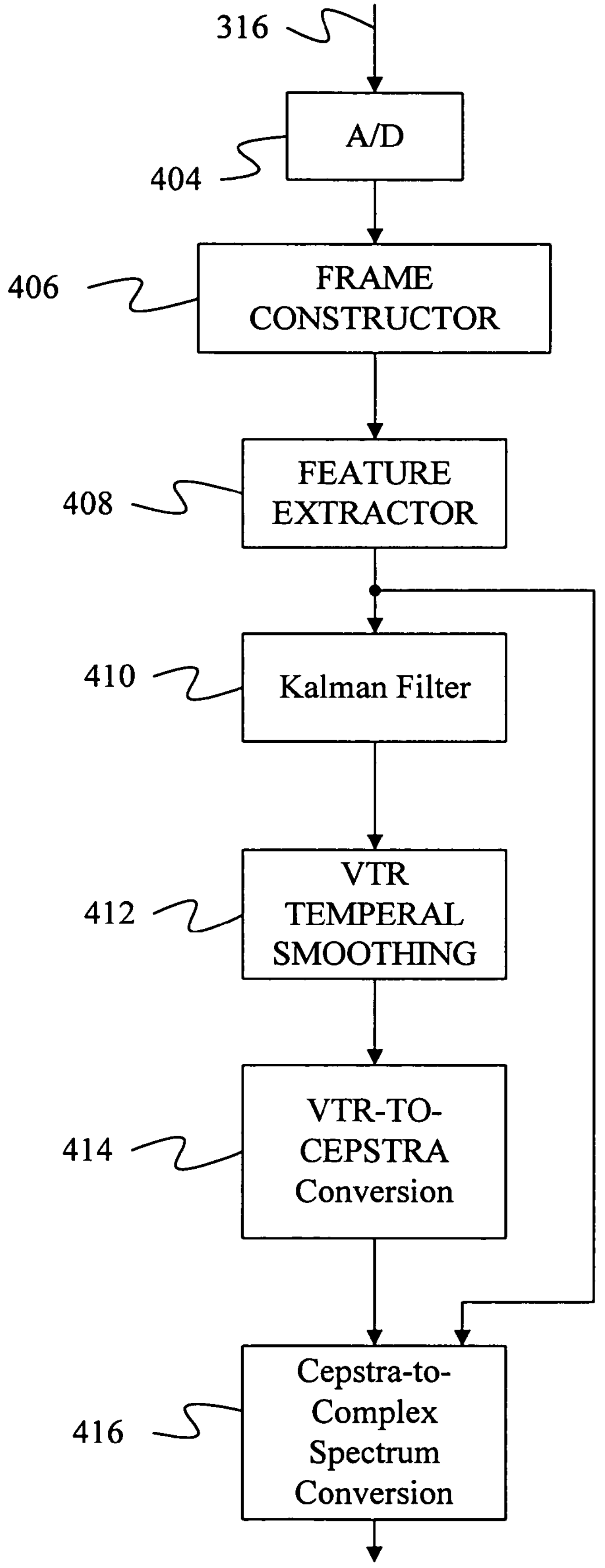
FIG. 4 is a flow diagram of a method for forming a synthesized alternative sensor signal.

FIG. 4 provides a flow diagram of a method for forming a synthesized alternative sensor signal from the alternative sensor signal. In step 404, the analog alternative sensor signal 316 is converted into a sequence of digital values. In one embodiment, A-to-D converter 404 samples the analog signal at 16 kHz and 16 bits per sample, thereby creating 32 kilobytes of speech data per second. At step 406, frames of data are formed from the sequence of digital values. Under one embodiment, a new respective frame is formed every 10 milliseconds that includes 20 milliseconds worth of data.

At step 408, the frames of digital values are applied to a feature extractor. Under one embodiment, the feature extractor is an LPC-cepstra feature extractor that identifies LPC coefficients that describe the digital values in the frame and then converts the LPC coefficients into cepstral values. Such feature extractors are well known in the art.

The features produced by feature extractor 408 are provided to an Extended Kalman Filter algorithm, which uses the features to identify VTRs for the frame.

To do this, the hidden vocal tract resonance frequencies and bandwidths are modeled as a sequence of hidden states that each produces an observation. In one particular embodiment, the hidden vocal tract resonance frequencies and bandwidths are modeled using a state equation of:

$$x_t=\Phi x_{t-1}+(I-\Phi)u+w, \qquad \text{Eq. 1}$$

and an observation equation of:

$$o_t=C(x_t)+\mu+v_t \qquad \text{Eq. 2}$$

where $x_t$ is a hidden vocal tract resonance vector at time t consisting of $x_t=\{f_1,f_2,f_3,f_4,b_1,b_2,b_3,b_4\}$, $x_{t-1}$ is a hidden vocal tract resonance vector at a previous time t-1, $\Phi$ is a system matrix, I is the identity matrix, u is a target vector for the vocal tract resonance frequencies and bandwidths, $w_t$ is noise in the state equation, $o_t$ is an observed vector, $C(x_t)$ is a mapping function from the hidden vocal tract resonance vector to an observation vector, $\mu$ is a residual between the mapping function and the observation and $v_t$ is the noise in the observation. Under one embodiment, $\Phi$ is a diagonal matrix with each entry having a value between 0.7 and 0.9 that has been empirically determined, and u is a vector, which, in one embodiment, has a value of: $(500\ 1500\ 2500\ 3500\ 200\ 300\ 400\ 400)^T$ Under this embodiment, the noise parameters $w_t$ and $v_t$ have values determined by random Gaussian samples with a zero mean vector and with diagonal covariance matrices. The diagonal elements of these matrices in this embodiment have values between 10 and 30,000 for wt, and values between 0.8 and 78 for vt.

Under one embodiment, the observed vector is a Linear Predictive Coding-Cepstra (LPC-cepstra) vector where each component of the vector represents an LPC order. As a result, the mapping function $C(x_t)$ can be determined precisely by an analytical nonlinear function. The nth component of the vector-valued function $C(x_t)$ for frame t is:

$$C_i(x_i)=\sum_{p=1}^{P}\frac{2}{i}e^{-\pi i\frac{b_p(t)}{f_s}}\cos\left(2\pi i\frac{f_p(t)}{f_s}\right) \qquad \text{EQ. 3}$$

where $C_t(x_t)$ is the ith element in an Ith order LPC-Cepstrum feature vector, P is the number of vocal tract resonance (VTR) frequencies, $f_p(t)$ is the pth VTR frequency for frame t, $b_p(t)$ is the pth VTR bandwidth for frame t, and $f_s$ is the sampling frequency, which in many embodiments is 8 kHz and in other embodiments is 16 kHz. The $C_0$ element is set equal to logG, where G is a gain.

To identify a sequence of hidden vocal tract resonance vectors from a sequence of observation vectors, the present invention uses an Extended Kalman filter. An Extended Kalman filter provides a recursive technique that can determine a best estimate of the continuous-valued hidden vocal tract resonance vectors in the non-linear dynamic system represented by Equations 1 and 2. Such Extended Kalman filters are well known in the art.

The Extended Kalman filter requires that the right-hand side of Equations 1 and 2 be linear with respect to the hidden vocal tract resonance vector. However, the mapping function of Equation 3 is non-linear with respect to the vocal tract resonance vector. To address this, the present invention uses a piecewise linear approximation in place of the non-linear term. Under one embodiment, each cycle of the sinusoid in each of the P=4 terms of Equation 3 is divided into ten non-uniform regions over the frequency axis. For example, for the first-order cepstrum consisting of only half a cycle of a sinusoid, five regions are predefined, and as many as 75 regions are used for the I=15 order cepstrum.

Using these linear approximations, Equation 3 is rewritten as:

$$C_i(x_t) \propto \sum_{p=1}^{P} \frac{2}{i}(\alpha_{r,ip} f_{pt} + \chi_{r,ip} b_{pt} + \beta_{r,ip}) \quad \text{EQ. 4}$$

where $\alpha_{r,ip}$ is the slope associated with the pth frequency, $\chi_{r,ip}$ is the slope associated with the pth bandwidth, and $\beta_{r,ip}$ is the combined intercept of the linear segment that approximates the mapping and are defined as:

$$\alpha_{r,ip} = \frac{c_{r+1,ip} - c_{r,ip}}{f_{r+1,p} - f_{r,p}} \quad \text{EQ. 5}$$

$$\chi_{r,ip} = \frac{c_{r+1,ip} - c_{r,ip}}{b_{r+1,p} - b_{r,p}} \quad \text{EQ. 6}$$

$$\beta_{r,ip} = 2c_{r,ip} - \alpha_{r,ip} f_{r,p} - \chi_{r,ip} b_{r,p} \quad \text{EQ. 7}$$

where $c_{r+1,ip}$ of equation 5 is the pth term for the ith order of right hand side of equation 3 determined for the value of $f_p$ at the beginning of range r+1 ($f_{r+1,p}$), and the value of $b_p$ at the beginning of range r ($b_{r,p}$); $c_{r+1,ip}$ of equation 6 is the pth term for the ith order of right hand side of equation 3 determined for the value of $f_p$ at the beginning of range r ($f_{r,p}$) and the value of $b_p$ at the beginning of range r+1 ($b_{r+1,p}$); and $c_{r,ip}$ is the pth term for the ith order of right hand side of equation 3 determined for the value of $f_p$ at the beginning of range r ($f_{r,p}$) and the value of $b_p$ at the beginning of range r ($b_{r,p}$).

Equation 4 evaluated for each order i can be represented in matrix form as:

$$C_r(x_t) = A_r \cdot x_t + d_r \quad \text{EQ. 8}$$

where $$A_r = \begin{bmatrix} \alpha_{r,1,1} & \alpha_{r,1,2} & \alpha_{r,1,3} & \alpha_{r,1,4} & \chi_{r,1,1} & \chi_{r,1,2} & \chi_{r,1,3} & \chi_{r,1,4} \\ \alpha_{r,2,1} & \alpha_{r,2,2} & \alpha_{r,2,3} & \alpha_{r,2,4} & \chi_{r,2,1} & \chi_{r,2,2} & \chi_{r,2,3} & \chi_{r,2,4} \\ \vdots & \vdots & \vdots & \vdots & \vdots & \vdots & \vdots & \vdots \\ \alpha_{r,15,1} & \alpha_{r,15,2} & \alpha_{r,2,3} & \alpha_{r,15,4} & \chi_{r,15,1} & \chi_{r,15,2} & \chi_{r,15,3} & \chi_{r,15,4} \end{bmatrix} \quad \text{EQ. 9}$$

$$d_r = \begin{bmatrix} \gamma_{r,1} \\ \gamma_{r,2} \\ \vdots \\ \gamma_{r,3} \end{bmatrix} \quad \text{EQ. 10}$$

$$\gamma_{ri} = \sum_{p=1}^{P} \beta_{r,ip} \quad \text{EQ. 11}$$

Using this linear approximation for the mapping, observation equation 2 becomes:

$$o_t = A_r \cdot x_t + d_r + \mu + v_t \quad \text{Eq. 12}$$

In this form, as long as the parameters are fixed based on the regions of the segment, an Extended Kalman Filter is applied directly to obtain the sequence of continuous valued states $x_{1:T}$ from a sequence of observed LPC-cepstral feature vectors $o_{1:T}$.

Figure 5:
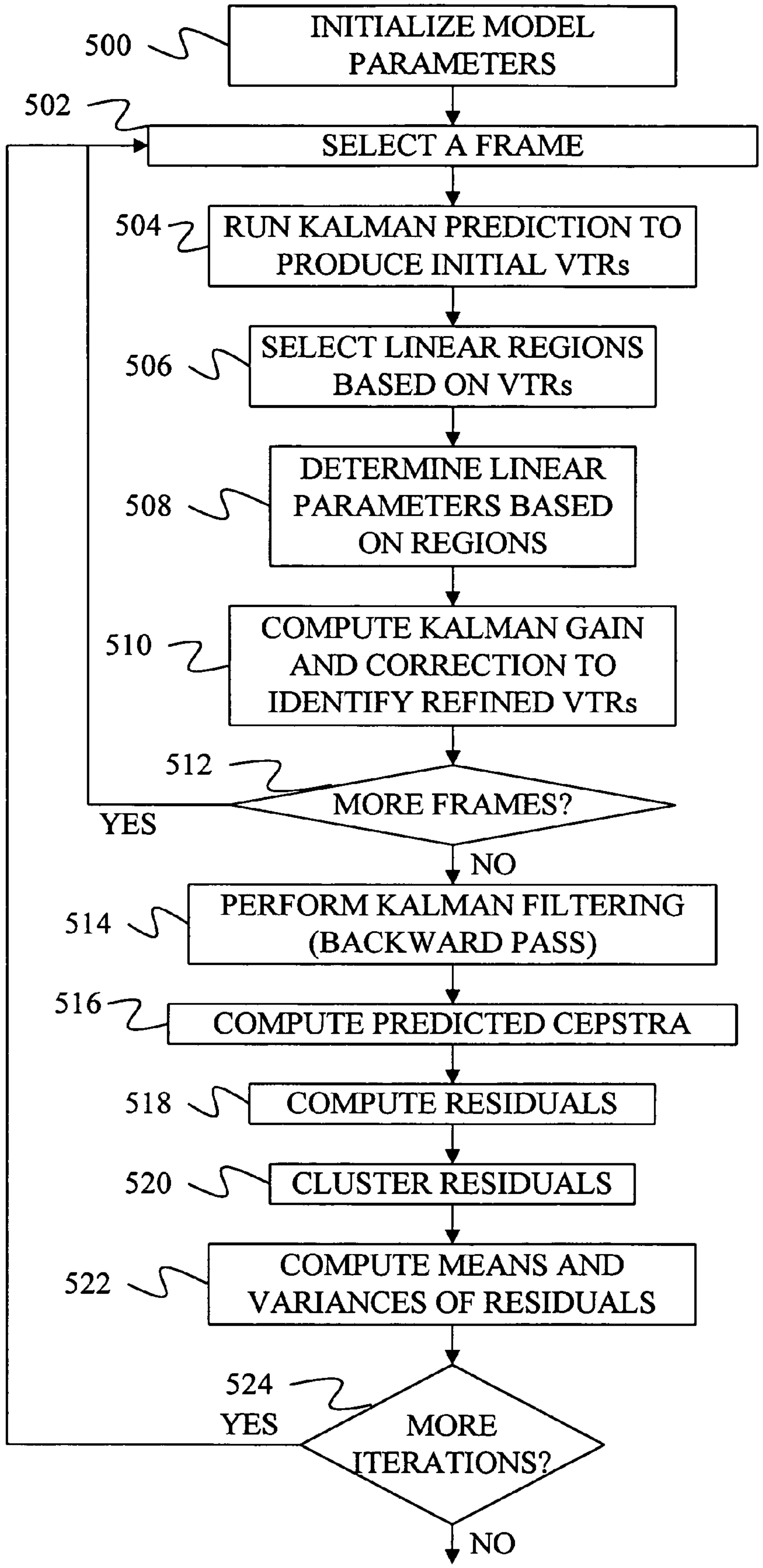
FIG. 5 is a flow diagram for identifying vocal tract resonances in an alternative sensor signal.

FIG. 5 provides a general flow diagram for identifying a sequence of continuous valued VTRs from the LPC-cepstral feature vectors.

In step 500, the model parameters for the state equation and the observation equation are initialized. In particular, parameters u and Φ and the covariance of the noise $w_t$ and $v_t$ are initialized in step 500. Under one embodiment, the target VTRs, u, are empirically set as a phone-independent values that represent roughly the mean VTR values across all phones. Under one particular embodiment, u=(500 Hz, 1500 Hz, 2500 Hz, 3600 Hz, 100 Hz, 150 Hz, 200 Hz, 250 Hz). The system matrix Φ is set as a diagonal matrix with each diagonal element being fixed at 0.6. The variances for the noise $w_t$, which is designated as Q, is assumed to be a diagonal matrix and is initialized by taking sample variances, component-by-component, based on the difference between formants identified by an existing formant tracker on a training speech sample and the formants predicted by the model of equation 1. The variance for the noise $v_t$, which is designated as R, is also assumed to be a diagonal matrix and is initialized by taking the determining the residual, component-by-component, by taking the difference between the LCP-cepstra determined from a training speech sample and one predicted by equations 1 and 2.

After the model parameters have been initialized, a frame is selected at step 502 and a prediction step of the Extended Kalman filter is run at step 504 to produce initial VTRs for the frame. This involves computing the following values:

$$x_t^- = \Phi x_{t-1} + (I-\Phi)u \quad \text{EQ. 13}$$

$$P_t^- = \Phi P_{t-1}\Phi^r + Q \quad \text{EQ. 14}$$

where $P_0$ is zero and Q is the covariance of the noise $w_t$ in the state model.

Using the initial VTR, linear regions, r, in the piecewise linear approximation to the mapping function are identified at step 506. At step 508, the linear parameters $A_r$ and $d_r$ are determined using equations 9, 10 and 11 above.

Once the parameters have been determined, the Extended Kalman Gain and correction are calculated at step 510 to provide a refined estimate of the VTR for the frame based on the observation. Specifically, the following calculations are made:

$$K_t = P_t^- A_r^T (A P_t^- A_r^T + R)^{-1} \quad \text{EQ. 15}$$

$$x_t = x_t^- + K_t(o_t - A_r x_t^- - d_r - \mu) \quad \text{EQ. 16}$$

$$P_t = (I - K_t A_r) P_t^- \quad \text{EQ. 17}$$

where $K_t$ is the Extended Kalman gain, equation 16 is the Extended Kalman correction, which provides the refined VTR, $o_t$ is the observed LPC-cepstra from the alternative sensor signal, R is the covariance of the noise term $v_t$, and I is the identity matrix.

After step 510, the process determines if there are more frames of the alternative sensor signal at step 512. If there are more frames, the process returns to step 502 to select the next frame and steps 504 through 510 are performed for the next frame.

When all of the frames have been processed at step 512, Extended Kalman smoothing is performed on the sequence of frames at step 514.

After step 514, a sequence of VTRs has been produced. At step 516, the sequence of VTRs is converted into LPC-cepstra using equation 3 above. The calculated LPC-cepstra are then subtracted from the observed LPC-cepstra of the alternative sensor signal to form a set of residuals at step 518. The residuals are grouped using K-mean clustering to form M classes at step 520. At step 522, the mean of each class is used to update the value of residual p and the variance of each class is determined and is used to update the variance of the noise term $v_t$, which is denoted as R. Separate values for the residual and variance terms are identified for each class and are associated with the frames assigned to those classes.

At step 524, the process determines if additional iterations should be performed to refine the estimates of the VTRs. If more iterations are desired, the process returns to step 502 to select the first frame. During the next iteration, the values for the residual μ and the variance R determined at step 522 are used based on the association between the frame and the class.

When sufficient iterations have been performed, Extended Kalman filter process 410 of FIG. 4 is complete. At step 412 of FIG. 4, the sequence of VTRs produced by the Extended Kalman filter are smoothed using a 1-2-1 kernal across time, which generates a VTR vector for a current frame by averaging across the preceding frame, the current frame, and the following frame while applying twice the weight to the current frame as to the two neighboring frames.

At step 414, the smoothed VTRs are converted into the cepstral domain using equations 2 and 3 above. At step 416, the cepstra values are converted into the complex spectral domain using the following equation:

$$\hat{B} = B\sqrt{M^{-1} e^{C^{-1}(\hat{B}_m - B_m)}} \quad \text{EQ. 18}$$

where M and C are the mel and discrete cosine transform filters, respectively, B and $\hat{B}$ are the complex spectra of the alternative sensor signal and the synthesized alternative sensor signal, respectively, and $B_m$ and $\hat{B}_m$ are the mel-cepsta of the alternative sensor signal and the synthesized alternative sensor signal, respectively. The mel-cepstra are formed by applying the mel filter to the LPC-cepstra formed in step 414 and to the LPC-cepstra of the observed alternative sensor signal produced by feature extractor 408.

In another embodiment, the synthesized alternative sensor signal is formed by fusing VTRs from the alternative sensor signal with VTRs from the air conduction microphone. In such an embodiment, the VTRs for the alternative signal are determined as described above. VTRs for the air conduction microphone are determined in a similar manner using air conduction microphone signal 318 instead of alternative sensor signal 316 in the method described above.

The VTRs from the air conduction microphone signal and the VTRs from the alternative sensor signal are combined as:

$$VTR_S = \alpha VTR_{ALT} + (1-\alpha) J \cdot VTR_{AC} \quad \text{EQ. 19}$$

where $VTR_S$ is the combined VTR vector for a frame, $VTR_{ALT}$ is the VTR vector identified from the alternative sensor signal, $VTR_{AC}$ is the VTR vector identified from the air conduction signal, α is a weighting parameter, and J is a mapping from VTRs for the air conduction microphone to VTRs for the alternative sensor where the mapping is trained on VTRs identified for both channels from a same speech signal.

The combined VTRs are then converted into the cepstral domain using equations 2 and 3 above. The cepstra values are then converted into the complex spectral domain using equation 18 above with the cepstral values formed from the combined VTRs used as $\hat{B}_m$. This produces the complex spectra for the synthesized alternative sensor signal.

Figure 6:
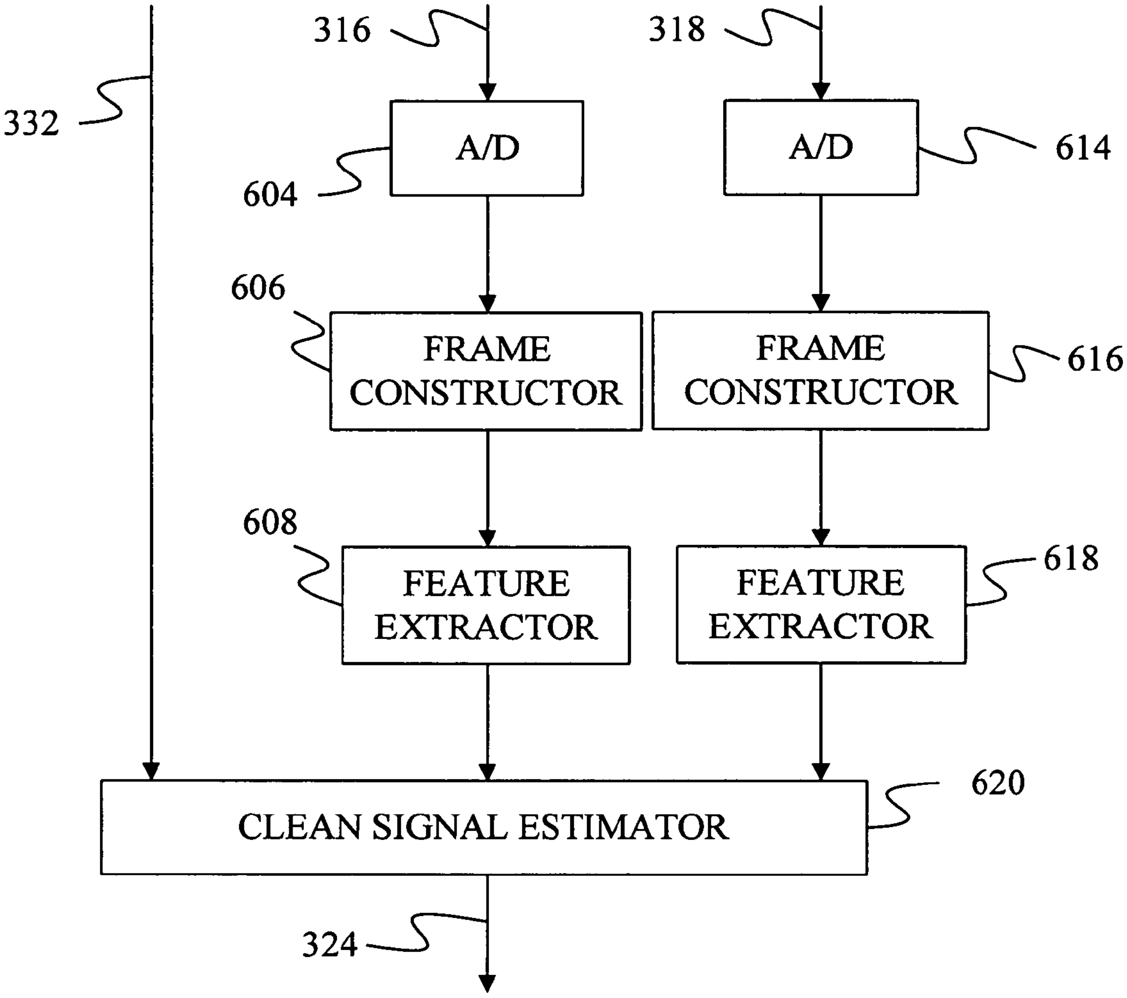
FIG. 6 is a block diagram for a clean signal estimator.

The complex spectral domain values 332 for the synthesized alternative signal, alternative sensor signal 316 (B) and air conduction microphone signal 318 (Y) are provided to a clean signal estimator 322, which estimates a clean signal 324. Within clean signal estimator 322, alternative sensor signal 316 and microphone signal 318 are converted into the complex spectral domain. As shown in FIG. 6, alternative sensor signal 316 and air conduction microphone signal 318 are provided to analog-to-digital converters 604 and 614, respectively, to generate a sequence of digital values, which are grouped into frames of values by frame constructors 606 and 616, respectively. In one embodiment, A-to-D converters 604 and 614 sample the analog signals at 16 kHz and 16 bits per sample, thereby creating 32 kilobytes of speech data per second and frame constructors 606 and 616 create a new respective frame every 10 milliseconds that includes 20 milliseconds worth of data.

Each respective frame of data provided by frame constructors 606 and 616 is converted into the complex spectral domain using Fast Fourier Transforms (FFT) 608 and 618, respectively.

The complex spectral domain values for the alternative sensor signal, the air conduction microphone signal, and the synthesized alternative sensor signal are provided to clean signal estimator 620, which uses the values to estimate clean speech signal 324.

Under one embodiment, the clean speech signal is estimated by fusing the alternative sensor signal, the air-conduction microphone signal and the synthesized alternative sensor using the following equation:

$$X_{t,k} = \frac{\sigma_2^2\sigma_3^2 Y_{t,k} + \sigma_1^2\sigma_3^2 H_k^* B_{t,k} + \sigma_1^2\sigma_2^2 G_k^* \hat{B}_{t,k}}{\sigma_2^2\sigma_3^2 + \sigma_1^2\sigma_3^2|H_k|^2 + \sigma_1^2\sigma_2^2|G_k|^2} \quad \text{EQ. 20}$$

where $X_{t,k}$ is the kth frequency component of the clean signal estimate for frame t, $Y_{t,k}$ is the kth frequency component of the air-conduction microphone signal for frame t, $B_{t,k}$ is the kth frequency component of the alternative sensor signal for frame t, $\hat{B}_{t,k}$ is the kth frequency component of the synthesized alternative sensor signal for frame t, $H_k$ is the estimated channel distortion function for the alternative sensor, $G_k$ is the estimated channel distortion for the synthesized alternative sensor signal, X* indicates the complex conjugate of the value X, |X| indicates the magnitude of the complex value, and $\sigma_1^2$, $\sigma_2^2$ and $\sigma_3^2$ are the variances of the zero mean Gaussian noise in the air-conduction microphone signal, the alternative sensor signal, and the synthesized alternative sensor signal, respectively.

The variances of the noise terms for the air-conduction microphone and the alternative sensor signal, $\sigma_1^2$ and $\sigma_2^2$, are determined from frames that do not include speech.

To identify frames where the user is not speaking, the alternative sensor signal can be examined. Since the alternative sensor signal will produce much smaller signal values for background speech than for noise, when the energy of the alternative sensor signal is low, it can be assumed that the speaker is not speaking. The values of the air conduction microphone signal and the alternative sensor signal for frames that do not contain speech are stored in a buffer and are used to compute variance of the noise in the alternative sensor signal as:

$$\sigma_2^2 = \frac{1}{N_v}\sum_{all\, t\in V}|B_t|^2 \quad \text{EQ. 21}$$

where $N_v$ is the number of noise frames in the utterance that are being used to form the variances, and V is the set of noise frames where the user is not speaking.

The variance of the noise for the air-conduction microphone, $\sigma_1^2$, is estimated based on the observation that the air-conduction microphone is less prone to sensor noise than the alternative sensor. As such, the variance of the air-conduction microphone can be calculated as:

$$\sigma_1^2 = 0.0001\sigma_2^2 \quad \text{EQ. 22}$$

The variance for the noise for the synthesized alternative signal is not determined directly from the synthesized alternative signal because the process of forming the synthesized alternative signal removes most noise from the signal. To avoid having a value of zero for the variance of the noise in the alternative sensor signal, which would provide a zero weight to the air-conduction microphone signal and the alternative sensor signal in equation 20, one embodiment sets the noise of the synthesized alternative sensor signal equal to the noise of the alternative sensor signal such that $\sigma_3^2=\sigma_2^2$.

The alternative sensor signal's channel distortion, $H_k$, is estimated from the air-conduction microphone signal, $Y_k$ and of the alternative sensor signal $B_k$ across the last T frames in which the user is speaking. Specifically, $H_k$ is determined as:

$$H_k = \frac{\sum_{t=1}^{T}(g^2\sigma_v^2|B_{t,k}|^2 - \sigma_2^2|Y_{t,k}|^2) \pm \sqrt{\left(\sum_{t=1}^{T}(g^2\sigma_v^2|B_{t,k}|^2 - \sigma_2^2|Y_{t,k}|^2)\right)^2 4g^2\sigma_v^2\sigma_2^2\left|\sum_{t=1}^{T}B_{t,k}^*Y_{t,k}\right|^2}}{2g^2\sigma_v^2\sum_{t=1}^{T}B_{t,k}^*Y_{t,k}} \quad \text{Eq. 23}$$

where $\sigma_v^2$ is the variance of the ambient noise V, g is a tunable parameter for the variance of the ambient noise, and T is the number of frames in which the user is speaking. Here, it is assumed that $H_k$ is constant across all time frames T. In other embodiments, instead of using all the T frames equally, a technique known as "exponential aging" is used so that the latest frames contribute more to the estimation of $H_k$ than the older frames.

The variance of the ambient noise is computed as:

$$\hat{\sigma}_v^2 = \frac{1}{N_v}\sum_{all\, t\in V}|Y_t|^2 \quad \text{EQ. 24}$$

and under one embodiment, g is set equal to 1.

The synthesized alternative sensor signal's channel distortion, $G_k$, is estimated in a manner similar to $H_k$, such that:

$$G_k = \frac{\sum_{t=1}^{T}(g^2\sigma_v^2|\hat{B}_{t,k}|^2 - \sigma_3^2|Y_{t,k}|^2) \pm \sqrt{\left(\sum_{t=1}^{T}(g^2\sigma_v^2|\hat{B}_{t,k}|^2 - \sigma_3^2|Y_{t,k}|^2)\right)^2 4g^2\sigma_v^2\sigma_3^2\left|\sum_{t=1}^{T}\hat{B}_{t,k}^*Y_{t,k}\right|^2}}{2g^2\sigma_v^2\sum_{t=1}^{T}\hat{B}_{t,k}^*Y_{t,k}} \quad \text{Eq. 25}$$

where the variance of the noise in the synthesized alternative sensor signal has been substituted for the variance of the noise in the alternative sensor signal and the synthesized alternative sensor signal has been substituted for the synthesized alternative sensor signal.

In an alternative embodiment, the synthesized alternative sensor signal's channel distortion is estimated based on the channel distortion of the alternative sensor signal and the channel distortion between the alternative sensor signal and the synthesized alternative sensor signal such that:

$$G_k = H_k G_{k,1} \quad \text{EQ. 26}$$

where $G_{k,1}$ is determined as:

$$G_{k,1} = \frac{\sum_{t=1}^{T}\left(\sigma_2^2|\hat{B}_{t,k}|^2 - \sigma_3^2|B_{t,k}|^2\right) \pm \sqrt{\left(\sum_{t=1}^{T}\left(\sigma_2^2|\hat{B}_{t,k}|^2 - \sigma_3^2|B_{t,k}|^2\right)\right)^2 4\sigma_2^2\sigma_3^2\left|\sum_{t=1}^{T}\hat{B}_{t,k}^{*}B_{t,k}\right|^2}}{2\sigma_2^2\sum_{t=1}^{T}\hat{B}_{t,k}^{*}B_{t,k}} \quad \text{Eq. 27}$$

Figure 7:
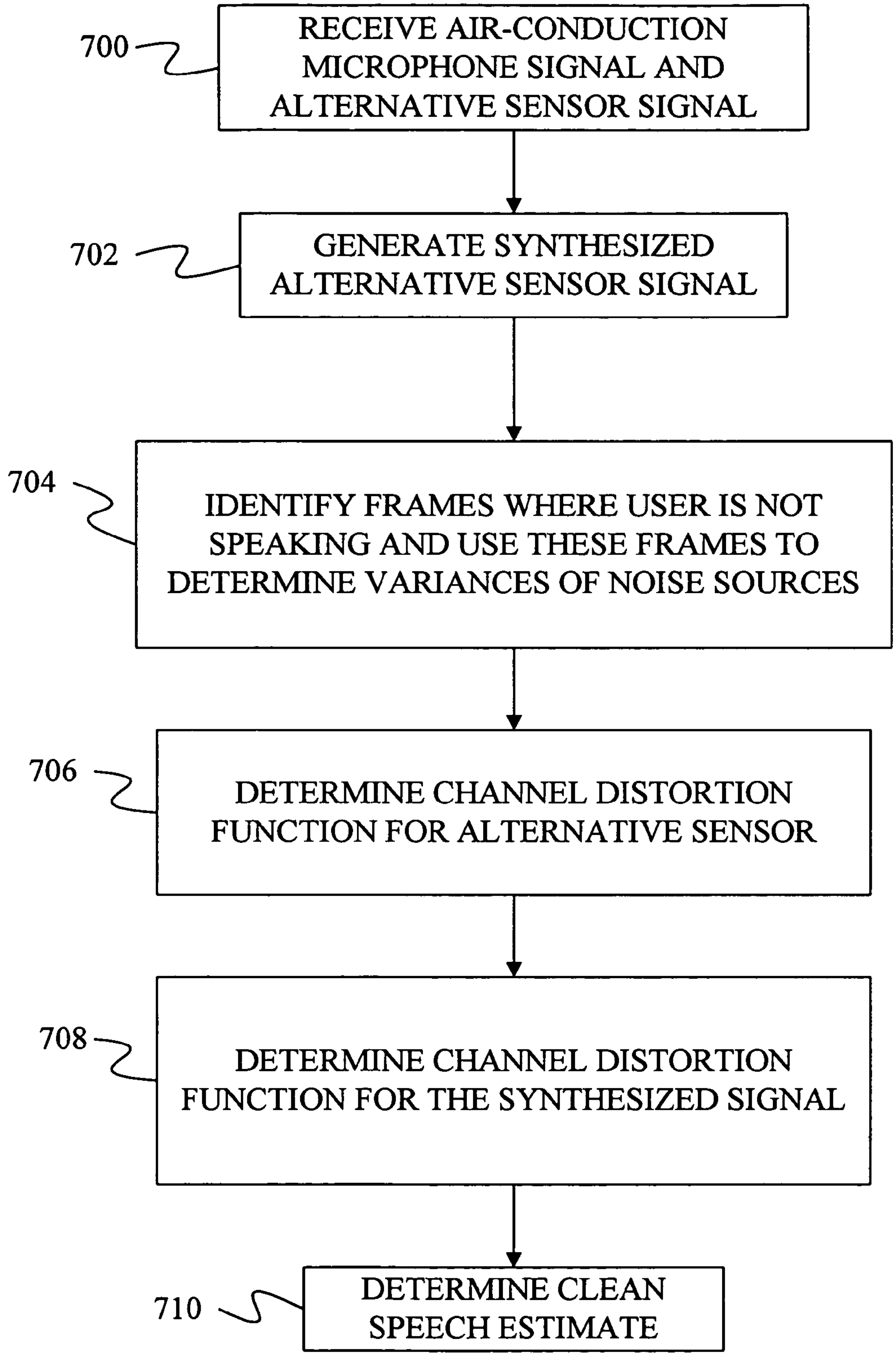
FIG. 7 is a flow diagram for enhancing speech under an embodiment of the present invention.

FIG. 7 provides a method of estimating a clean speech signal using the equations above. In step 700, frames of the air-conduction microphone signal and alternative sensor signal are received and at step 702, the synthesized alternative sensor signal is formed from the alternative sensor signal as described above.

At step 704, frames of an input utterance are identified where the user is not speaking. These frames are then used to determine the variance for the ambient noise $\sigma_v^2$, the variance for the alternative sensor noise $\sigma_2^2$, and the variance for the air conduction microphone noise $\sigma_1^2$, and the variance for the noise of the synthesized alternative sensor signal $\sigma_3^2$.

At step 706, the channel distortion for the alternative sensor is determined using equation 23 above and at step 708 the channel distortion for the synthesized alternative sensor is determined using either equation 25 or equation 27 above. The clean signal estimate is then formed at step 710 using fusion equation 20 above.

Although the present invention has been described with reference to particular embodiments, workers skilled in the art will recognize that changes may be made in form and detail without departing from the spirit and scope of the invention.

What is claimed is:

1. A method of determining an estimate for a noise-reduced value representing a portion of a noise-reduced speech signal, the method comprising:

generating an alternative sensor signal using an alternative sensor;

forming a synthesized alternative sensor signal based on the alternative sensor signal; and using the alternative sensor signal, and the synthesized alternative sensor signal to form an estimate of the noise-reduced value.

2. The method of claim 1 further comprising generating an air-conduction microphone signal and using the air-conduction microphone signal with the alternative sensor signal and the synthesized alternative sensor signal to form the estimate of the noise-reduced value.

3. The method of claim 1 wherein forming the synthesized alternative sensor signal comprises identifying vocal tract resonances in the alternative sensor signal and using the identified vocal tract resonances to construct the synthesized alternative sensor signal.

4. The method of claim 3 wherein identifying vocal tract resonances comprises identifying a sequence of vocal tract resonances and then applying temporal smoothing to the sequence of vocal tract resonances to from a final sequence of vocal tract resonances.

5. The method of claim 3 wherein constructing the synthesized alternative sensor signal from the vocal tract resonances comprises using phase information from the alternative sensor signal to construct the synthesized alternative sensor signal.

6. The method of claim 5 wherein constructing the synthesized alternative sensor signal comprises:

forming cepstral values from the vocal tract resonances;

determining cepstral values from the alternative sensor signal;

subtracting the cepstral values of the alternative sensor signal from the cepstral values formed from the vocal tract resonances to form a cepstral difference;

converting the cepstral difference to the spectral domain to form a spectral difference; and using the spectral difference and a complex spectral domain value of the alternative sensor signal to form a complex spectral domain value for the synthesized alternative sensor signal.

7. The method of claim 1 wherein forming an estimate of the noise-reduced value further comprises utilizing the variance of a noise term associated with the synthesized alternative sensor signal.

8. The method of claim 1 wherein forming the synthesized alternative sensor signal comprises:

identifying vocal tract resonances in the alternative sensor signal;

identifying vocal tract resonances in an air conduction microphone signal; and using vocal tract resonances identified in the alternative sensor signal and the vocal tract resonance identified in the air conduction microphone signal to construct the synthesized alternative sensor signal.

9. The method of claim 1 wherein forming an estimate of the noise-reduced value further comprises utilizing a channel distortion for the synthesized alternative sensor signal.

10. The method of claim 9 wherein the channel distortion for the synthesized alternative sensor signal is based on a channel distortion for the alternative sensor signal.

11. A computer-readable medium having computer-executable instructions for performing steps comprising:

receiving a sensor signal representing speech;

identifying vocal tract resonances in the sensor signal;

converting the identified vocal tract resonances into a synthesized sensor signal; and using the synthesized sensor signal to identify a clean speech value.

12. The computer-readable medium of claim 11 wherein identifying a clean speech value further comprises using the sensor signal to identify the clean speech value.

13. The computer-readable medium of claim 12 wherein identifying the clean speech value further comprises using an additional sensor signal to identify the clean speech value.

14. The computer-readable medium of claim 11 wherein converting the identified vocal tract resonances into a synthesized sensor signal comprises:

forming cepstral values from the vocal tract resonances;

forming cepstral values from the sensor signal;

subtracting the cepstral values formed from sensor signal from the cepstral values formed from the vocal tract resonances to form a difference; and using the difference to form the synthesized sensor signal.

15. The computer-readable medium of claim 11 wherein identifying vocal tract resonances comprises identifying an initial sequence of vocal tract resonances and then applying temporal smoothing to the initial sequence to form a final sequence of vocal tract resonances.

16. The computer-readable medium of claim 11 wherein identifying a clean speech value further comprises using a variance of a noise term associated with the synthesized sensor signal.

17. The computer-readable medium of claim 11 further comprising:

receiving a second sensor signal representing speech;

identifying vocal tract resonances in the second sensor signal; and wherein converting the identified vocal tract resonances into a synthesized sensor signal comprises combining the vocal tract resonances identified in the sensor signal and the vocal tract resonances identified in the second sensor signal to form combined vocal tract resonances and converting the combined vocal tract resonances into the synthesized sensor signal.

18. A method of identifying a clean speech value for a clean speech signal, the method comprising:

receiving an air-conduction microphone signal;

receiving an alternative sensor signal;

forming a synthesized alternative sensor signal; and using the air-conduction microphone signal, the alternative sensor signal and the synthesized alternative sensor signal to estimate the clean speech value.

19. The method of claim 18 wherein the synthesized alternative sensor signal is formed in part by identifying vocal tract resonances in the alternative sensor signal.

20. The method of claim 18 wherein forming the synthesized alternative sensor signal comprises converting identified vocal tract resonances into cepstral domain values, converting the alternative sensor signal into cepstral domain values, and subtracting the cepstral domain values of the alternative sensor signal from the cepstral domain values of the vocal tract resonances.

* * * * *